US006573682B1

(12) United States Patent
Pearson

(10) Patent No.: US 6,573,682 B1
(45) Date of Patent: Jun. 3, 2003

(54) FUEL CELL SYSTEM MULTIPLE STAGE VOLTAGE CONTROL METHOD AND APPARATUS

(75) Inventor: Martin T. Pearson, Burnaby (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 10/017,461

(22) Filed: Dec. 14, 2001

(51) Int. Cl.[7] .................................................. H02J 7/00
(52) U.S. Cl. ...................................... 320/101; 320/103
(58) Field of Search ................................ 320/101, 103, 320/110; 429/12, 17, 19, 21, 23, 13, 14, 15

(56) References Cited

U.S. PATENT DOCUMENTS

| 3,823,358 A | * | 7/1974 | Rey ............................ 320/101 |
| 4,000,003 A | | 12/1976 | Baker et al. .................... 429/7 |
| 4,056,764 A | | 11/1977 | Endo et al. ...................... 320/3 |
| 4,839,574 A | | 6/1989 | Takabayashi .................... 320/3 |
| 4,931,947 A | | 6/1990 | Werth et al. ................. 364/492 |
| 4,962,462 A | | 10/1990 | Fekete .......................... 364/492 |
| 5,334,463 A | | 8/1994 | Tajima et al. .................. 429/9 |
| 5,482,790 A | | 1/1996 | Yamada et al. ................. 429/9 |
| 5,624,768 A | | 4/1997 | Tanokura ..................... 429/23 |
| 5,929,594 A | | 7/1999 | Nonobe et al. ............. 320/104 |
| 5,998,885 A | | 12/1999 | Tamor et al. ............... 307/10.1 |
| 6,158,537 A | | 12/2000 | Nonobe ...................... 180/65.3 |
| 6,214,484 B1 | * | 4/2001 | Hauer ............................ 429/9 |
| 6,215,272 B1 | | 4/2001 | Ohara et al. ................. 320/104 |
| 6,255,008 B1 | * | 7/2001 | Iwase ............................ 429/9 |

FOREIGN PATENT DOCUMENTS

| EP | 136 187 A2 | 4/1985 |
| EP | 334 474 B1 | 9/1989 |
| EP | 1 065 775 A2 | 1/2001 |
| GB | 2 281 642 A | 3/1995 |
| WO | WO 01/73879 A1 | 10/2001 |

OTHER PUBLICATIONS

Fuglevand, W., "Full Cell Power System and Method of Controlling a Fuel Cell Power System," U.S. Publication No. 2001/005365 A1, published Dec. 20, 2001, patent application Ser. No. 09/916,791, filed Jul. 26, 2001.

Abstract of JP 05–047396, with Japanese figures, espacenet database, Feb. 26, 1993.

Abstract of JP 06–029029, espacenet database, Feb. 4, 1994.

Abstract of JP 06–314569, espacenet database, Nov. 8, 1994.

English Language Translation of Japanese Unexamined Patent No. JP 7–105965, Apr. 21, 1995.

Abstract of JP 08–050902, with Japanese Patent cover page, espacenet database, Feb. 20, 1996.

Abstract of JP 08–213032, with Japanese Patent cover page, espacenet database, Aug. 20, 1996.

Abstract of JP 11–191424, with Japanese figures, espacenet database, Jul. 13, 1999.

Abstract of DE 19810468, espacenet database, Sep. 16, 1999.

Abstract of JP 58–133789, with Japanese figures, espacenet database, Aug. 9, 1983.

Abstract of JP 59–134573, espacenet database, Aug. 2, 1984.

Abstract of JP 01–234024, with Japanese figures, espacenet database, Sep. 19, 1989.

* cited by examiner

Primary Examiner—Shawn Riley
Assistant Examiner—Lawrence Luk
(74) Attorney, Agent, or Firm—Seed IP Law Group PLLC

(57) ABSTRACT

A fuel cell system determines each of a battery charging current error, a battery voltage error, and a stack current error. The fuel cell system regulates current through a series pass element in response to a greater of the determined errors, operating in three modes: battery voltage limiting mode, stack current limiting mode and battery charging current limiting mode. Additionally, there can be a fourth "saturation" mode where the stack voltage $V_S$ drops below the battery voltage $V_B$. A voltage difference across the series pass element is compared to a desired condition such as a saturation level, and a partial pressure of a reactant flow to the fuel cell stack adjusted based on the determined amount of deviation limiting the energy dissipated by the series pass element. Individual fuel cell systems can be combined in series and/or parallel to produce a combined fuel cell system having a desired output voltage and current.

59 Claims, 11 Drawing Sheets

*Fig. 9A*
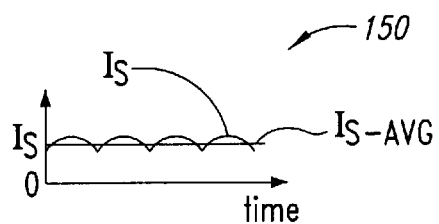
*Fig. 9B*
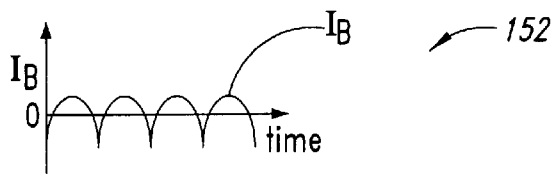
*Fig. 9C*
*Fig. 9D*
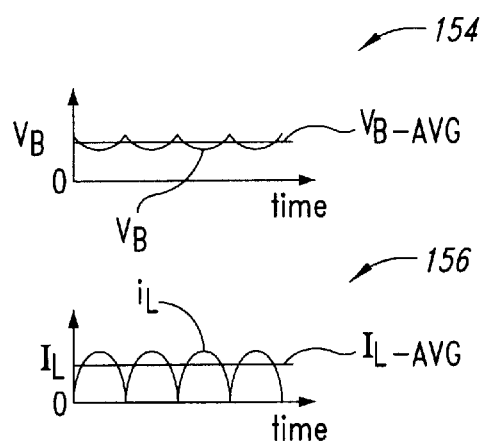
*Fig. 9E*
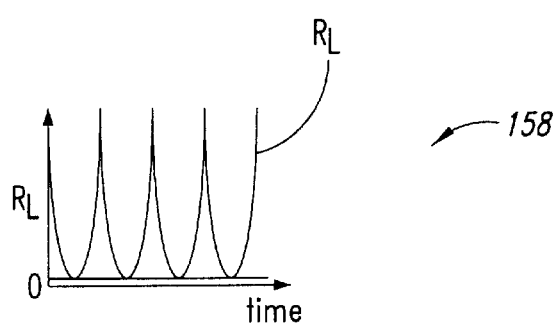
*Fig. 9F*
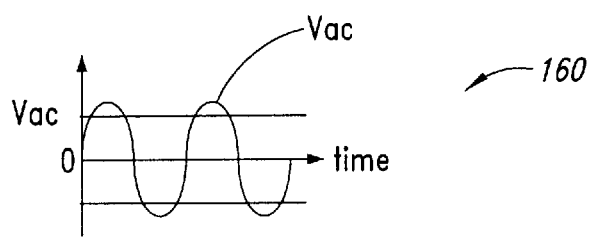

US 6,573,682 B1

FUEL CELL SYSTEM MULTIPLE STAGE VOLTAGE CONTROL METHOD AND APPARATUS

BACKGROUND OF THE INVENTION

1. Field of the Invention

This invention is generally related to fuel cell systems, and more particularly to controlling an output voltage of the fuel cell system.

2. Description of the Related Art

Electrochemical fuel cells convert fuel and oxidant to electricity. Solid polymer electrochemical fuel cells generally employ a membrane electrode assembly ("MEA") which includes an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane electrode interface to induce the desired electrochemical reaction. In operation, the electrodes are electrically coupled for conducting electrons between the electrodes through an external circuit. Typically, a number of MEAs are electrically coupled in series to form a fuel cell stack having a desired power output.

In typical fuel cells, the MEA is disposed between two electrically conductive fluid flow field plates or separator plates. Fluid flow field plates have flow passages to direct fuel and oxidant to the electrodes, namely the anode and the cathode, respectively. The fluid flow field plates act as current collectors, provide support for the electrodes, provide access channels for the fuel and oxidant, and provide channels for the removal of reaction products, such as water formed during fuel cell operation. The fuel cell system may use the reaction products in maintaining the reaction. For example, reaction water may be used for hydrating the ion exchange membrane and/or maintaining the temperature of the fuel cell stack.

Stack current is a direct function of the reactant flow, the stack current increasing with increasing reactant flow. The stack voltage varies inversely with respect to the stack current in a non-linear mathematical relationship. The relationship between stack voltage and stack current at a given flow of reactant is typically represented as a polarization curve for the fuel cell stack. A set or family of polarization curves can represent the stack voltage-current relationship at a variety of reactant flow rates.

In most applications, it is desirable to maintain an approximately constant voltage output from the fuel cell stack. One approach is to employ a battery in the fuel cell system to provide additional current when the demand of the load exceeds the output of the fuel cell stack. This approach often requires a separate battery charging supply to maintain the charge on the battery, introducing undesirable cost and complexity into the system. Attempts to place the battery in parallel with the fuel cell stack to eliminate the need for a separate battery charging supply raises additional problems. These problems may include, for example, preventing damage to the battery from overcharging, increasing efficiency, as well as the need for voltage, current, or power conversion or matching components between the fuel cell stack, battery and/or load. A less costly, less complex and/or more efficient approach is desirable.

BRIEF SUMMARY OF THE INVENTION

In one aspect, a fuel cell system includes: a fuel cell stack, a battery, a series pass element electrically coupled between at least a portion of the fuel cell stack and a portion of the battery, a regulating circuit for regulating current through the series pass element in response to a greater of a battery charging current error, a battery voltage error, and a stack current error, a reactant delivery system for delivering reactant to the fuel cells, the reactant delivery system including at least a first control element adjustable to control a partial pressure in a flow of a reactant to at least some of the fuel cells, and a control circuit coupled to receive signals corresponding to a voltage on an input side and an output side of the series pass element and configured to determine a deviation of a voltage difference across the series pass element from a desired operational condition based on the received signals, the control circuit further coupled to control the at least first control element based on the determined deviation. The fuel cell system may include a battery charging current error integrator having a first input coupled to receive a battery charging current signal and a second input coupled to receive a battery charging current limit signal. The fuel cell system may also include a battery voltage error integrator having a first input coupled to receive a battery voltage signal and a second input coupled to receive a battery voltage limit signal. The fuel cell system may further include a stack current error integrator having a first input coupled to receive a stack current signal and a second input coupled to receive a stack current limit signal. The fuel cell system may additionally include an OR circuit for selecting a greater of the battery charging current error, the battery voltage error and the stack current error.

In another aspect, a fuel cell system includes: a number of fuel cells forming a fuel cell stack, a number of battery cells forming a battery, a series pass element, a blocking diode electrically coupled between the fuel cell stack and the series pass element, a regulating circuit for regulating current through the series pass element in proportion to at least a greater of a difference between a battery charging current and a battery charging current limit, a difference between a battery voltage and a battery voltage limit, and a difference between a stack current and a stack current limit, a reactant delivery system for delivering reactant to the fuel cells, the reactant delivery system including at least a first flow regulator adjustable to control a partial pressure in a flow of a reactant to at least some of the fuel cells, and a control circuit coupled to receive signals corresponding to a voltage difference across the series pass element and to provide a control signal to at least the first control element mathematically related to a voltage difference across the series pass element.

In yet another aspect, a circuit for a fuel cell system includes a series pass element electrically coupleable between at least a portion of the fuel cell stack and a portion of the battery, a regulating circuit for regulating current through the series pass element in response to a greater of a battery charging current error, a battery voltage error and a stack current error, and a control circuit coupled to receive signals corresponding to a voltage on an input side and an output side of the series pass element and configured to determine a deviation of a voltage difference across the series pass element from a desired operational condition based on the received signals and to produce a control signal based on the determined deviation.

In a further aspect, a circuit for a fuel cell system includes a series pass element, a blocking diode electrically coupled in series with the series pass element, a regulating circuit coupled to the series pass element to regulate a current through the series pass element in proportion to at least a greater of a difference between a battery charging current and a battery charging current limit, a difference between a battery voltage and a battery voltage limit, and a difference between a stack current and a stack current limit, and a control circuit coupled to receive signals corresponding to a voltage across the serried pass element and to provide a control signal mathematically related to a voltage difference across the series pass element.

In yet a further aspect, a circuit for a fuel cell system includes a battery charging sensor, a battery charging current error integrator, a battery voltage sensor, a battery voltage error integrator, a stack current sensor, a stack current error integrator, an OR circuit coupled to the output of each of the battery current error integrator, the battery voltage error integrator and the stack current error integrator, a series pass element having a pair of terminals for selectively providing a current path and a control terminal coupled to the OR circuit for regulating current through the current path in proportion to a greater of the battery current error signal, the battery voltage error signal and the stack current error signal, and a control circuit coupled to receive signals corresponding to a voltage on an input side and an output side of the series pass element and configured to determine a deviation of a voltage difference across the series pass element from a desired operational condition based on the received signals and to produce a control signal based on the determined deviation.

In even a further aspect, a method of operating a fuel cell system includes: supplying current at a number of output terminals from at least one of a fuel cell stack and a battery electrically coupled in parallel with the fuel cell stack, in a first stage, regulating a current through a series pass element in proportion to at least a greater of a difference between a battery charging current and a battery charging current limit, a difference between a battery voltage and a battery voltage limit, and a difference between the stack current and the stack current limit, and in a second stage, adjusting a partial pressure of a reactant flow to at least a portion of the fuel cell stack to maintain a series pass element at a desired saturation level.

In even a further aspect, a method of operating a fuel cell system includes: determining a battery charging current error, determining a battery voltage error, determining a stack current error, regulating current through the series pass element in response to a greater of the battery charging current error, the battery voltage error, and the stack current error, determining a voltage difference across the series pass element, determining an amount of deviation of the determined voltage difference from a desired operational condition of the series pass element, and for at least one reactant flow to at least a portion of the fuel cell stack, adjusting a partial pressure of the reactant flow based on the determined amount of deviation. Determining the battery charging current error may include integrating a difference between a battery charging current and a battery charging current limit over time. Determining the battery voltage error may include integrating a difference between a battery voltage and a battery voltage limit over time. Determining the stack current error may include integrating a difference between a stack current and a stack current limit over time. The method may also include selecting the greater of the battery charging current error, the battery voltage error and the stack current error, level shifting the selected one of the errors, and applying the level shifted error to a control terminal of the series pass element. The method may further include determining a temperature proximate the battery and determining the battery voltage limit based at least in part on a determined temperature.

In still a further aspect, a method of operating a fuel cell system includes: determining a difference between a battery charging current and a battery charging current limit, determining a difference between a battery voltage and a battery voltage limit, determining a difference between a stack current and a stack current limit, regulating a current through a series pass element in proportion to at least a greater of the difference between the battery charging current and the battery charging current limit, the difference between the battery voltage and the battery voltage limit, and the difference between the stack current and the stack current limit, determining a voltage difference across the series pass element, determining an amount of deviation of the determined voltage difference from a desired operational condition of the series pass element, and for at least one reactant flow to at least a portion of the fuel cell stack, adjusting a partial pressure of the reactant flow based on the determined amount of deviation.

In yet still a further aspect, a combined fuel cell system includes two or more individual fuel cell systems electrically coupled in series and/or parallel combinations to produce a desired current at a desired voltage.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 1 is a schematic diagram of a fuel cell system powering a load, the fuel cell system having a fuel cell stack, a battery, a series pass element, a first stage including a regulating circuit for controlling current flow through the series pass element and a second stage including a controller employing a voltage difference across the series pass element to reduce the energy dissipated by the series pass element via control of reactant partial pressure in accordance with an illustrated general embodiment in the invention.

FIGS. 9A–9F are a series of graphs relating stack, battery and load currents, battery and bus voltages and load resistances of the fuel cell system, where the fuel cell stack is sufficiently powering the load without draining or recharging the battery.

Figure 10A:
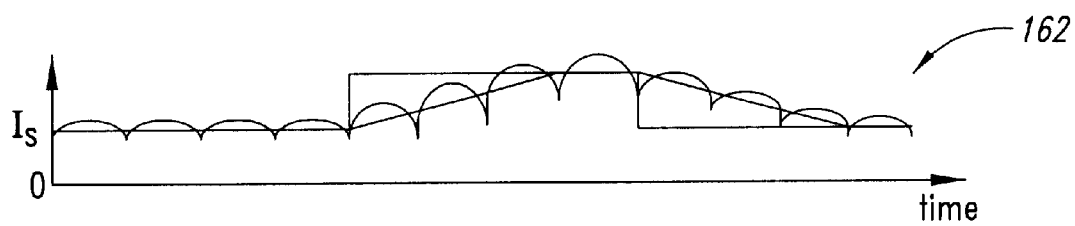
Figure 10B:
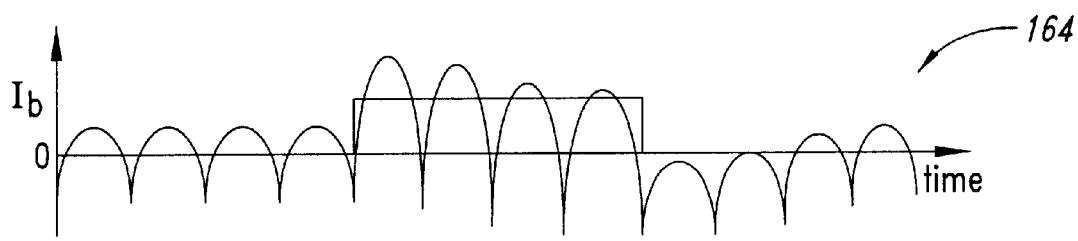
Figure 10C:
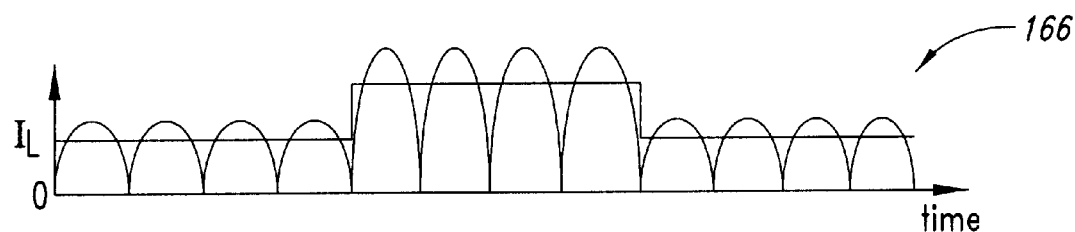

FIGS. 10A–C are a series of graphs relating stack, battery and load current over time for the fuel cell systems, where the battery supplies current to the load to cover a shortfall from the fuel cell stack and the fuel cell stack later recharges the battery.

Figure 1:
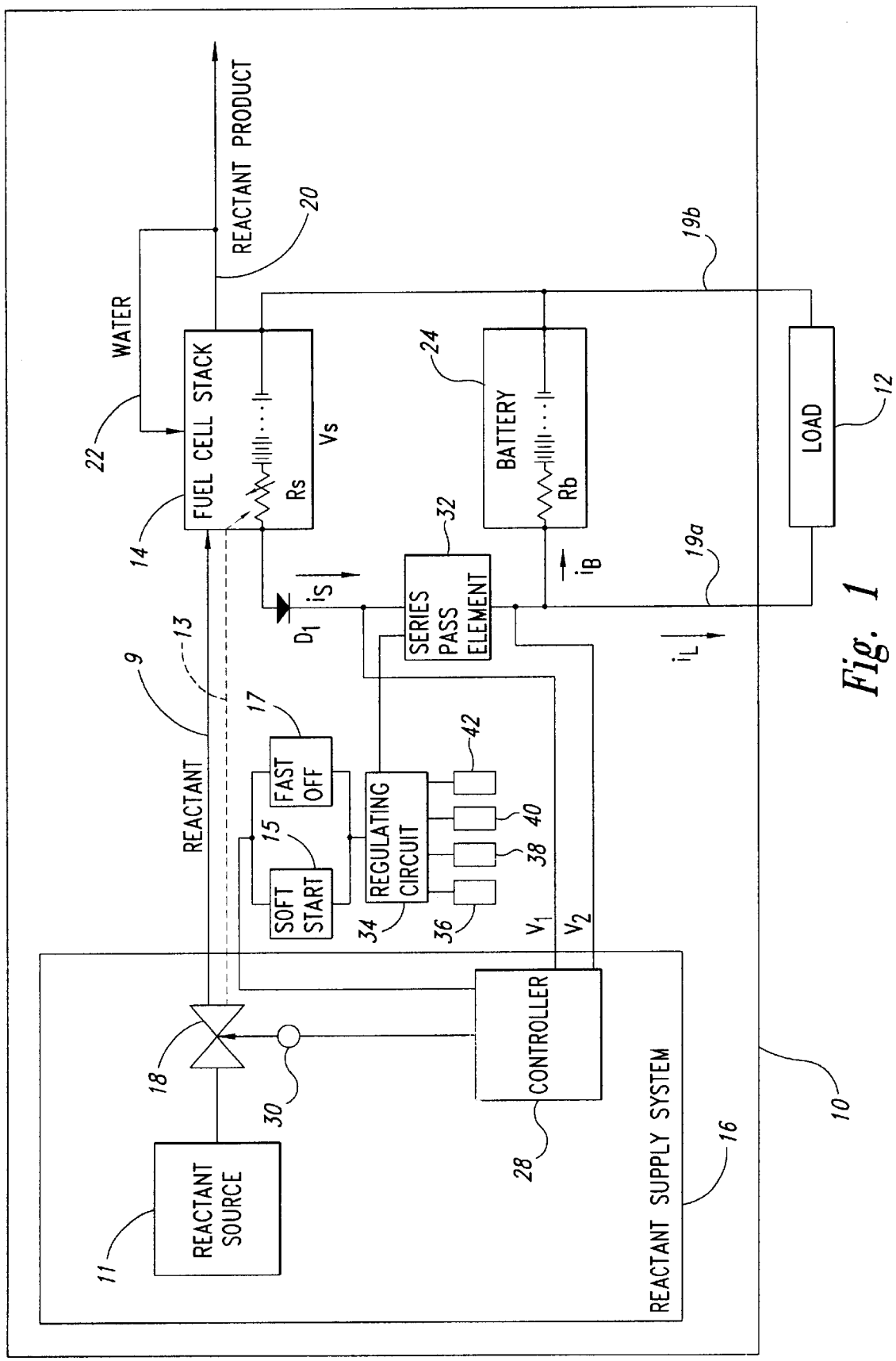
Figure 11:
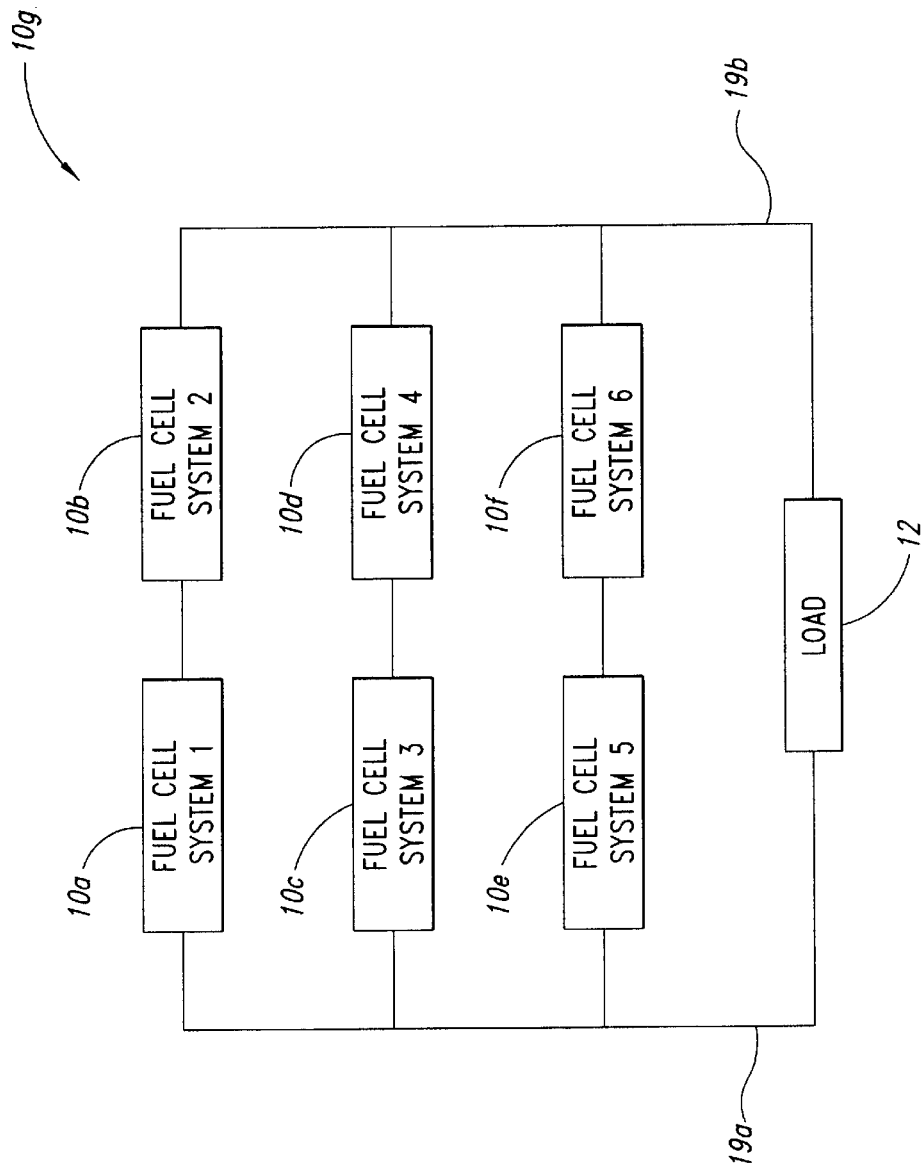

FIG. 11 is a schematic diagram of a number of the fuel cell systems of FIG. 1, electrically coupled to form a combination fuel cell system for powering a load at a desired voltage and current.

DETAILED DESCRIPTION OF THE INVENTION

In the following description, certain specific details are set forth in order to provide a thorough understanding of the various embodiments of the invention. However, one skilled in the art will understand that the invention may be practiced without these details. In other instances, well-known structures associated with fuel cells, fuel cell stacks, batteries and fuel cell systems have not been shown or described in detail to avoid unnecessarily obscuring descriptions of the embodiments of the invention.

Unless the context requires otherwise, throughout the specification and claims which follow, the word"comprise" and variations thereof, such as,"comprises" and "comprising" are to be construed in an open, inclusive sense, that is as"including, but not limited to."

Fuel Cell System Overview

FIG. 1 shows a fuel cell system 10 providing power to a load 12 according to an illustrated embodiment of the invention. The load 12 typically constitutes the device to be powered by the fuel cell system 10, such as a vehicle, appliance, computer and/or associated peripherals. While the fuel cell system 10 is not typically considered part of the load 12, portions of the fuel cell system 10 such as the control electronics may constitute a portion or all of the load 12 in some possible embodiments.

The fuel cell system 10 includes a fuel cell stack 14 composed of a number of individual fuel cells electrically coupled in series. The fuel cell stack 14 receives reactants, represented by arrow 9, such as hydrogen and air via a reactant supply system 16. The reactant supply system 16 may include one or more reactant supply reservoirs or sources 11, a reformer (not shown), and/or one or more control elements such as one or more compressors, pumps and/or valves 18 or other reactant regulating elements. Operation of the fuel cell stack 14 produces reactant product, represented by arrow 20, typically including water. The fuel cell system 10 may reuse some or all of the reactant products 20. For example, as represented by arrow 22, some or all of the water may be returned to the fuel cell stack 14 to humidify the hydrogen and air at the correct temperature and/or to hydrate the ion exchange membranes (not shown) or to control the temperature of the fuel cell stack 14.

The fuel cell stack 14 can be modeled as an ideal battery having a voltage equivalent to an open circuit voltage and a series resistance $R_S$. The value of the series resistance $R_S$ is principally a function of stack current Is, the availability of reactants, and time. The series resistance $R_S$ varies in accordance with the polarization curves for the particular fuel cell stack 14. The series resistance $R_S$ can be adjusted by controlling the availability of reactants 9 to drop a desired voltage for any given current, thus allowing an approximately uniform stack voltage $V_S$ across a range of stack currents Is. The relationship between the reactant flow and the series resistance $R_S$ is illustrated in FIG. 1 by the broken line arrow 13. However, simply decreasing the overall reactant and reaction pressures within the fuel cell system 10 may interfere with the overall system operation, for example interfering with the hydration of the ion exchange membrane and/or temperature control of the fuel cell stack. To avoid these undesirable results, the fuel cell system 10 may adjust the reactant partial pressure, as explained in more detail below.

The fuel cell stack 14 produces a stack voltage $V_S$ across a high voltage bus formed by the positive and negative voltage rails 19a, 19b. The stack current Is flows to the load 12 from the fuel cell stack 14 via the high voltage bus. As used herein,"high voltage" refers to the voltage produced by conventional fuel cell stacks 14 to power loads 12, and is used to distinguish between other voltages employed by fuel cell system 10 for control and/or communications (e.g., 5V). Thus, high voltage and is not necessarily"high" with respect to other electrical systems.

The fuel cell system 10 includes a battery 24 electrically coupled in parallel with the fuel cell stack 14 across the rails 19a, 19b of the high voltage bus to power the load 12. The open circuit voltage of the battery 24 is selected to be similar to the full load voltage of the fuel cell stack 14. An internal resistance $R_B$ of the battery 24 is selected to be much lower than the internal resistance of the fuel cell stack 14. Thus, the battery 24 acts as a buffer, absorbing excess current when the fuel cell stack 14 produces more current than the load 12 requires, and providing current to the load 12 when the fuel cell stack 14 produces less current than the load 12 requires. The voltage across the high voltage bus 19a, 19b will be the open circuit voltage of the battery 24 minus the battery discharging current multiplied by the value of the internal resistance $R_B$ of the battery 24. The smaller the internal resistance $R_B$ of the battery 24, the smaller the variations in bus voltage.

An optional reverse current blocking diode D1 can be electrically coupled between the fuel cell stack 14 and the battery 24 to prevent current from flowing from the battery 24 to the fuel cell stack 14. A drawback of the reverse current blocking diode D1 is the associated diode voltage drop. The fuel cell system 10 may also include other diodes, as well as fuses or other surge protection elements to prevent shorting and/or surges.

Stages

The fuel cell system 10 includes two control stages; a first stage employing a series pass element 32 and a regulating circuit 34 for controlling current flow through the series pass element 32, and a second stage employing a controller 28 for adjusting reactant partial pressures to control the series resistance $R_S$ of the fuel cell stack 14. The first and second stages operate together, even simultaneously, in cooperation with the parallel coupled battery 24 to achieve efficient and continuous output voltage control while protecting the battery 24 from damage.

The first stage is a relatively fast reacting stage, while the second stage is a slower reacting stage relative to the first stage. As discussed above, the battery 24 provides a very fast response to changes in load requirements, providing current to the load 12 when demand is greater than the output of the fuel cell stack 14 and sinking excess current when the output of the fuel cell stack 14 exceeds the demand of the load 12. By controlling the flow of current through the series pass element 32, the first stage ensures that the battery 24 is properly charged and discharged in an efficient manner without damage. By controlling the reactant partial pressures, and hence the series resistance $R_S$, the second stage controls the efficiency of the fuel cell stack 14 operation (i.e., represented as the particular polarization curve on which the fuel cell is operating). Thus, the second stage limits the amount of heat dissipated by the series pass element 32 by causing more energy to be dissipated via the fuel cell stack 14 (i.e., via less efficient operation).

Where the fuel cell stack 14 dissipates energy as heat, this energy is recoverable in various portions of the fuel cell system, and thus can be reused in other portions of the fuel cell system (i.e., cogeneration). For example, the energy dissipated as heat may be recycled to the fuel cell stack 14 via an airflow, stack coolant, or via the reactants. Additionally, or alternatively, the energy dissipated as heat may be recycled to a reformer (not shown), other portion of the fuel cell system 10, or to some external system. Additionally, limiting the amount of energy that the series pass element 32 must dissipate, can reduce the size and associated cost of the series pass element 32 and any associated heat sinks.

The details of the first and second stages are discussed in detail below.

First Stage Overview, Series Pass Element Regulator

With continuing reference to FIG. 1, the first stage of the fuel cell system 10 includes the series pass element 32 electrically coupled between the fuel cell stack 14 and the battery 24 for controlling a flow of current Is from the fuel cell stack 14 to the battery 24 and the load 12. The first stage of the fuel cell system 10 also includes the regulating circuit 34 coupled to regulate the series pass element 32 based on various operating parameters of the fuel cell system 10. The series pass element 32 can take the form of a field effect transistor ("FET"), having a drain and source electrically coupled between the fuel cell stack 14 and the battery 24 and having a gate electrically coupled to an output of the regulating circuit 34.

The first stage of the fuel cell system 10 includes a number of sensors for determining the various operating parameters of the fuel cell system 10. For example, the fuel cell system 10 includes a battery charge current sensor 36 coupled to determine a battery current $I_B$. Also for example, the fuel cell system 10 includes a fuel cell stack current sensor 38 coupled to determine the stack current $I_S$. Further for example, the fuel cell system 10 includes a battery voltage sensor 40 for determining a voltage $V_B$ across the battery 24. Additionally, the fuel cell system 10 may include a battery temperature sensor 42 positioned to determine the temperature of the battery 24 or ambient air proximate the battery 24. While the sensors 36–42 are illustrated as being discrete from the regulating circuit 34, in some embodiments one or more of the sensors 36–42 may be integrally formed as part of the regulating circuit 34.

The first stage of the fuel cell system 10 may include a soft start circuit 15 for slowly pulling up the voltage during startup of the fuel cell system 10. The fuel cell system 10 may also include a fast off circuit 17 for quickly shutting down to prevent damage to the battery 24, for example when there is no load or the load 12 is drawing no power.

Second Stage Overview, Reactant Partial Pressure Controller The second stage of the fuel cell system 10 includes the controller 28, an actuator 30 and the reactant flow regulator such as the valve 18. The controller 28 receives a value of a first voltage $V_1$ from an input side of the series pass element 32 and a value of a second voltage $V_2$ from an output side of the series pass element 32. The controller 28 provides a control signal to the actuator 30 based on the difference between the first and second voltages $V_1$, $V_2$ to adjust the flow of reactant to the fuel cell stack 14 via the valve 18 or other reactant flow regulating element.

Since the battery 24 covers any short-term mismatch between the available reactants and the consumed reactants, the speed at which the fuel cell reactant supply system 16 needs to react can be much slower than the speed of the electrical load changes. The speed at which the fuel cell reactant supply system 16 needs to react mainly effects the depth of the charge/discharge cycles of the battery 24 and the dissipation of energy via the series pass element 32.

First Stage Description Series Pass Element Regulation

Figure 2:
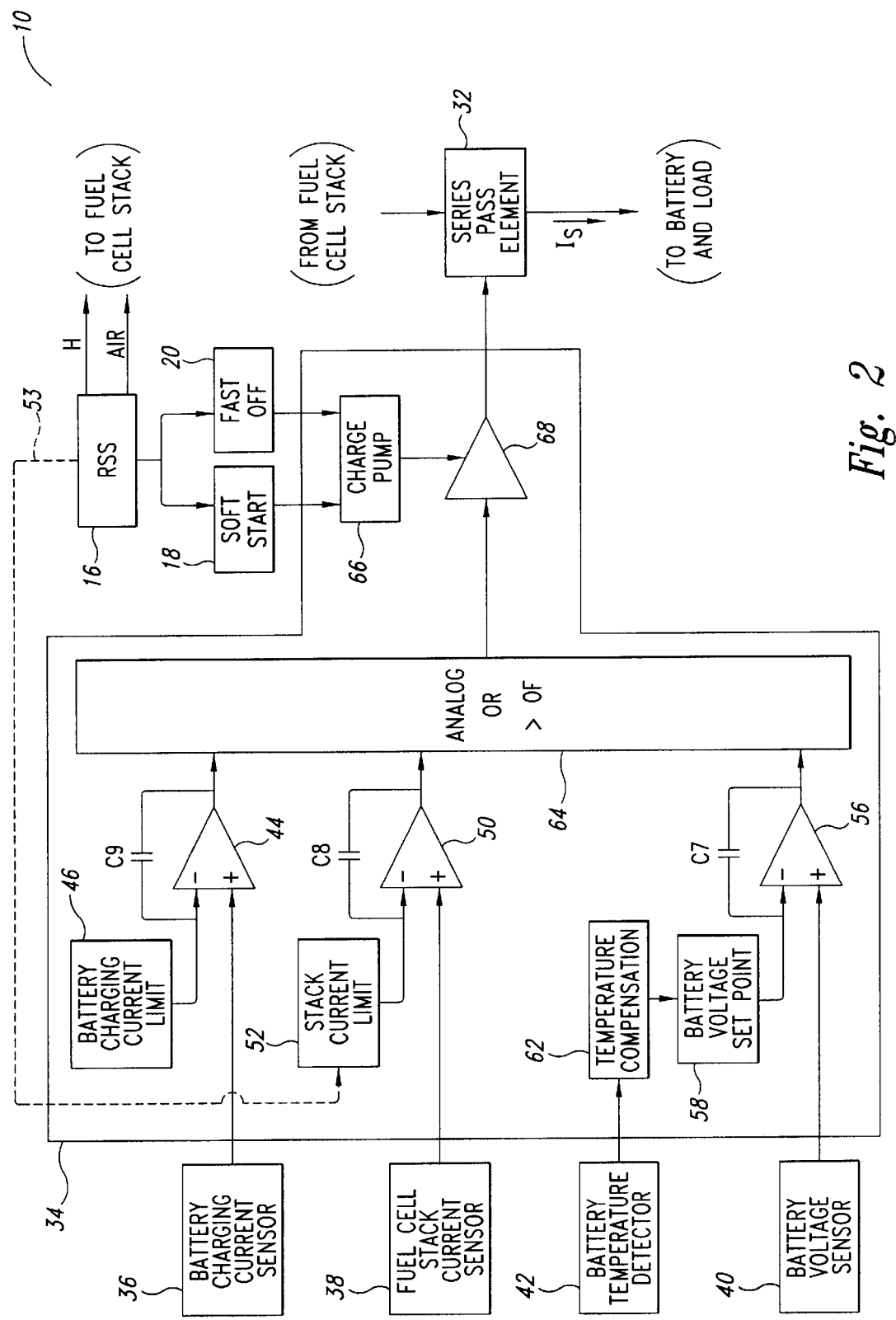
FIG. 2 is a schematic diagram of the first stage of the fuel cell system of FIG. 1.

FIG. 2 shows a one embodiment of the regulating circuit 34, including components for determining a battery charging current error, stack current error and battery voltage error, and for producing an output to the series pass element 32 corresponding to the greater of the determined errors.

The regulating circuit 34 includes a battery charging current error integrating circuit 44 and a battery charging current limit circuit 46 for determining the battery charging current error. The battery charging current limit circuit 46 provides a battery charging current limit value to the inverting terminal of the battery charging current error integrating circuit 44, while the battery charging current sensor 36 provides a battery charging current value to the non-inverting terminal. A capacitor C9 is coupled between the inverting terminal and an output terminal of the battery charging current error integrating circuit 44. The battery charging current limit error integrating circuit 44 integrates the difference between the battery charging current value and the battery charging current limit value.

The regulating circuit 34 includes a stack current error integrating circuit 50 and a stack current limit circuit 52 for determining the stack current error. The stack current limit circuit 52 provides a stack current limit value to the inverting terminal of the stack current error integrating circuit 50, while stack current sensor 38 provides a stack current value to the non-inverting terminal. A capacitor C8 is coupled between the inverting terminal and an output terminal of the stack current error integrating circuit 50. The stack current error integrating circuit 50 integrates the difference between the stack current value and the stack current limit value. The limiting effect of the second stage on the stack current limit is represented by broken line arrow 53.

The regulating circuit 34 includes a battery voltage error integrating circuit 56 and a battery voltage set point circuit 58. The battery voltage set point circuit 58 provides a battery voltage limit value to the inverting terminal of the battery voltage error integrating circuit 56, while the battery voltage sensor 40 provides a battery voltage value to the non-inverting terminal. A capacitor C7 is electrically coupled between the inverting terminal and the output terminal of the battery voltage error integrating circuit 56. The battery voltage error integrating circuit 56 integrates the difference between the battery voltage value and the battery voltage set point value.

The regulating circuit 34 may also include a temperature compensation circuit 62 that employs the battery temperature measurement from the battery temperature detector 42 to produce a compensation value. The battery voltage set point circuit 58 employs the compensation value in determining the battery voltage set point value.

The regulating circuit 34 also includes an OR circuit 64 for selecting the greater of the output values of the error integrators 44, 50, 56. The OR circuit 64 can take the form of three diodes (not shown) having commonly coupled cathodes. The anode of each of the diodes are electrically coupled to respective ones of the error integration circuits 44, 50, 56.

The regulating circuit 34 also includes a charge pump 66 for providing a voltage to a control terminal (e.g., gate) of the series pass element 32 by way of a level shifter, such as an inverting level shifter 68. The inverting level shifter 68 provides a linear output value that is inverted from the input value.

Figure 3:
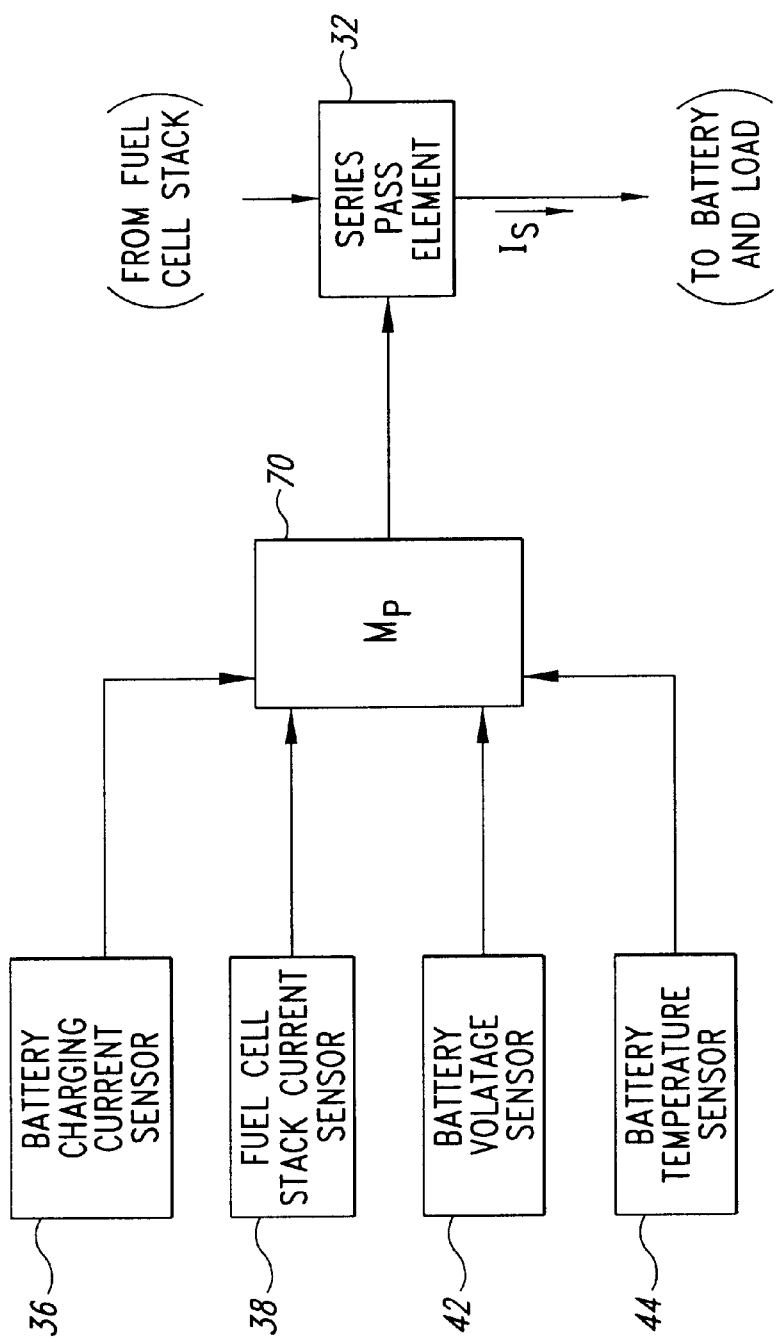
FIG. 3 is an alternative embodiment of the first stage of the fuel cell system, employing a microprocessor as the regulating circuit.

FIG. 3 shows an alternative embodiment of the first stage of the fuel cell system 10, employing a microprocessor 70 as the regulating circuit. This alternative embodiment and those other alternatives and alternative embodiments described herein are substantially similar to the previously described embodiments, and common acts and structures are identified by the same reference numbers. Only significant differences in operation and structure are described below.

The microprocessor 70 can be programmed or configured to perform the functions of the regulating circuit 34 (FIG. 1). For example, the microprocessor 70 may perform the error integration for some or all of the battery charging current, stack current and battery voltage values. The microprocessor 70 may store some or all of the battery charging current limit, stack current limit and/or battery voltage limit values. The microprocessor 70 may also determine the temperature compensation based on the battery temperature value supplied by the battery temperature detector 42. Further, the microprocessor 70 may select the greater of the error values, providing an appropriate signal to the control terminal of the series pass element 32.

Figure 4:
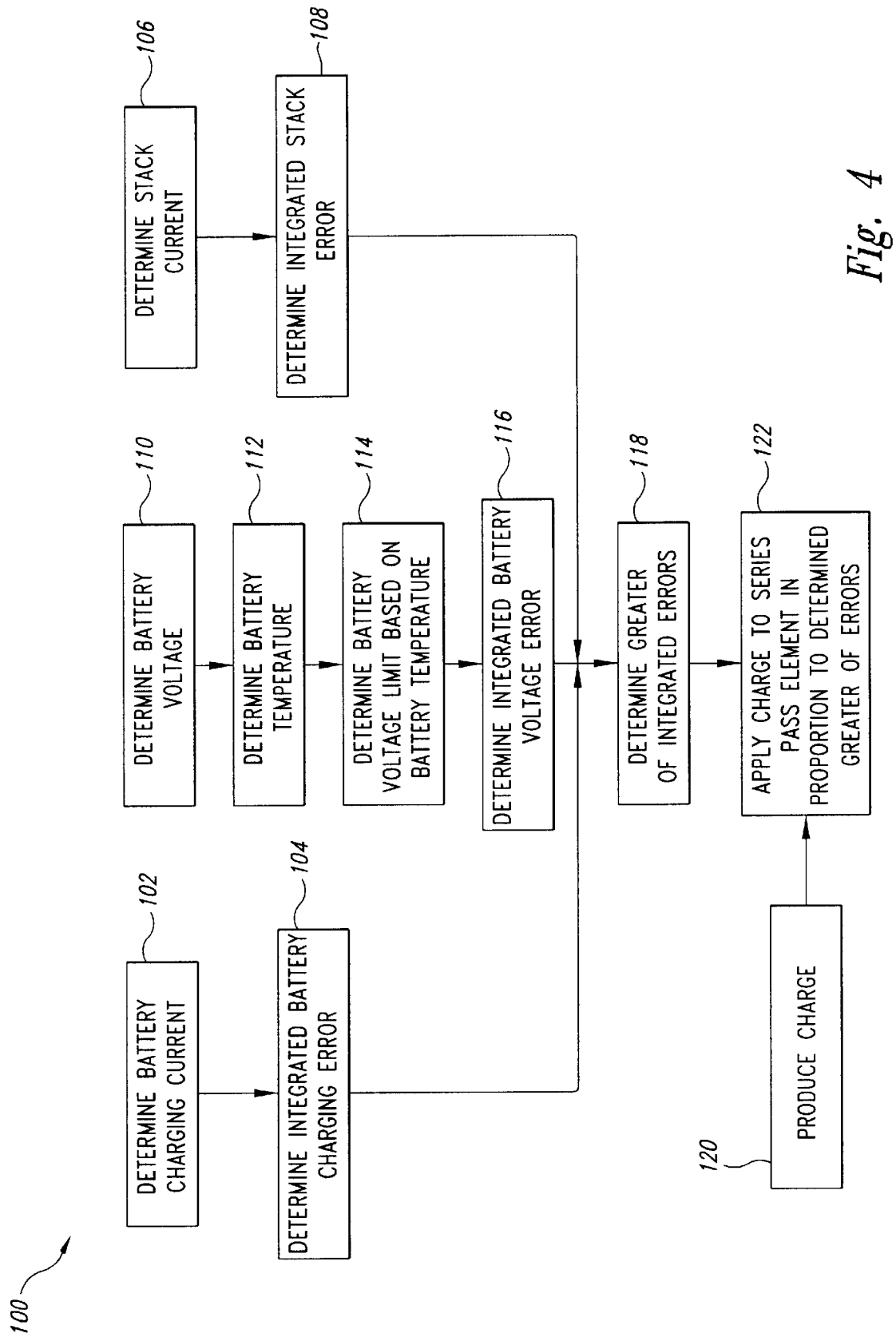
FIG. 4 is a flow diagram of an exemplary method of operating the first stage of the fuel cell system of FIGS. 2 and 3.

FIG. 4 shows an exemplary method 100 of operating the first stage of fuel cell system 10 of FIGS. 1, 2 and 3. The method 100 repeats during operation to continually adjust the operating parameters of the fuel cell system 10.

In step 102, the battery charging current sensor 36 (FIGS. 1–3) determines the value of the battery charging current $I_B$. In step 104, the battery charging current error integrating circuit 44 (FIG. 2) or microprocessor 70 (FIG. 3) determines the value of the battery charging current error.

In step 106, the stack current sensor 38 (FIGS. 1–3) determines the value of the stack current. In step 108, the stack current error integrating circuit 50 (FIG. 2) or microprocessor 70 (FIG. 3) determines the value of the stack current error.

In step 110, the battery voltage sensor 40 (FIGS. 1–3) determines the value of the voltage $V_B$ across the battery 24. In optional step 112, the battery temperature sensor 42 determines the temperature of the battery 24 or the ambient space proximate the battery 24. In optional step 114, the temperature compensation circuit 62 (FIG. 2) or microprocessor 70 (FIG. 3) determines the value of the battery voltage limit based on determined battery temperature. In step 116, the battery voltage error integrating circuit 56 (FIG. 2) or microprocessor 70 (FIG. 3) determines the value of the battery voltage error.

The fuel cell system 10 may perform the steps 102, 106 and 110 in a different order than described above, for example performing step 106 before step 102, or performing step 110 before step 102 and/or step 106. The sensors 36, 38, 40, 42 may perform the steps 102, 106, 110, 112 at the same time or approximately at the same time so as to appear be operating in parallel. Thus, the enumeration of the above acts does not identify any specific sequence or order.

In step 118, the OR circuit 64 (FIG. 2) or an OR circuit configured in the microprocessor 70 (FIG. 3) determines the greater of the determined errors values. The OR circuit may be hardwired in the microprocessor 70, or may take the form of executable instructions. In step 120, the charge pump 66 (FIG. 2) produces charge. While not illustrated, the embodiment of FIG. 3 may also include a charge pump, or the microprocessor 70 can produce an appropriate signal value. In step 122, the level shifter 68 (FIG. 2) or microprocessor 70 (FIG. 3) applies the charge as an input voltage to the control terminal of the series pass element 32 (FIGS. 1–3) in proportion to determined greater of errors values.

The first stage of the fuel cell system 10 thus operates in essentially three modes: battery voltage limiting mode, stack current limiting mode, and battery charging current limiting mode. For example, when the battery 24 is drained, the fuel cell system 10 will enter the battery charging current mode to limit the battery charging current in order to prevent damage to the battery 24. As the battery 24 recharges, the fuel cell system 10 enters the battery voltage limiting mode, providing a trickle charge to the battery 24 in order to maintain a battery float voltage (e.g., approximately 75%–95% of full charge) without sulfating the battery 24. As the load 12 pulls more current than the fuel cell stack 14 can provide, the fuel cell system 10 enters the stack current limiting mode. Additionally, there can be a fourth "saturation" mode where, as the load 12 pulls even more current, the stack voltage $V_S$ drops below the battery voltage $V_B$. The battery 24 will discharge in this"saturation" mode, eventually entering the battery charging current limiting mode when the battery 24 is sufficiently drained, as discussed above.

Second Stage Description, Reactant Partial Pressure Control

Figure 5:
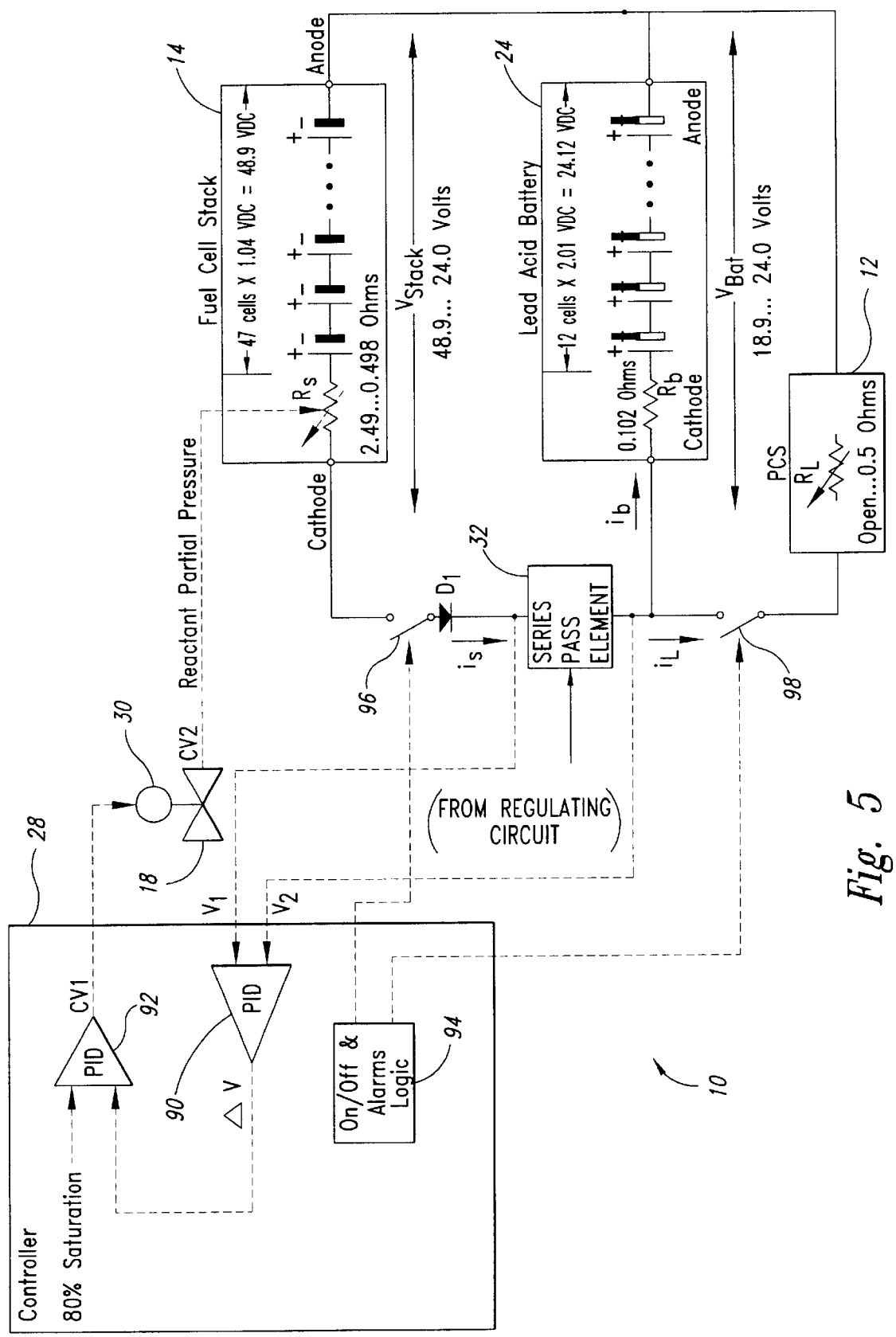
FIG. 5 is an electrical schematic diagram of the second stage of the fuel cell system of FIG. 1.

FIG. 5 illustrates the second stage in further detail, which employs a voltage difference across the series pass element 32 as the operating condition.

In particular, the controller 28 includes a first comparator 90 that receives the value of the first voltage $V_1$ from the input side of the series pass element 32 and the value of the second voltage $V_2$ from the output side of the series pass element 32. The first comparator 90 produces a process variable $\Delta V$ corresponding to a difference between the first and second voltages $V_1$, $V_2$.

The controller 28 also includes a second comparator 92 that receives the process variable $\Delta V$ from the first comparator 90 and a set point. The comparator 92 compares the process variable $\Delta V$ to the set point and produces a first control voltage CV1. The set point reflects the desired maximum operating level of the series pass element 32, and may typically be between approximately 75% and approximately 95% of the saturation value for the series pass element 32. A set point of 80% of the saturation value is particularly suitable, providing some resolution in the circuitry even when the fuel cell stack 14 is operating under a partial load.

The comparator 92 supplies the resulting control variable CV1 to the actuator 30 which adjusts the compressor or valve 18 accordingly. The valve 18 adjusts the reactant partial pressure to the fuel cell stack 14, which serves as a second control variable CV2 for the fuel cell system 10. As noted above, controlling the reactant partial pressure adjusts the internal resistance of $R_S$ of the fuel cell stack 14, as well as adjusting the power output of the fuel cell stack 14. The first and second comparators 90, 92 may be discrete components or may be implemented in a microprocessor, microcontroller or other integrated circuit.

The controller 28 may also include logic 94 for controlling various switches, such as a first switch 96 that electrically couples the battery 24 in parallel with the fuel cell 14, and second switch 98 that electrically couples the load 12 in parallel with the fuel cell stack 14 and the battery 24.

Figure 6:
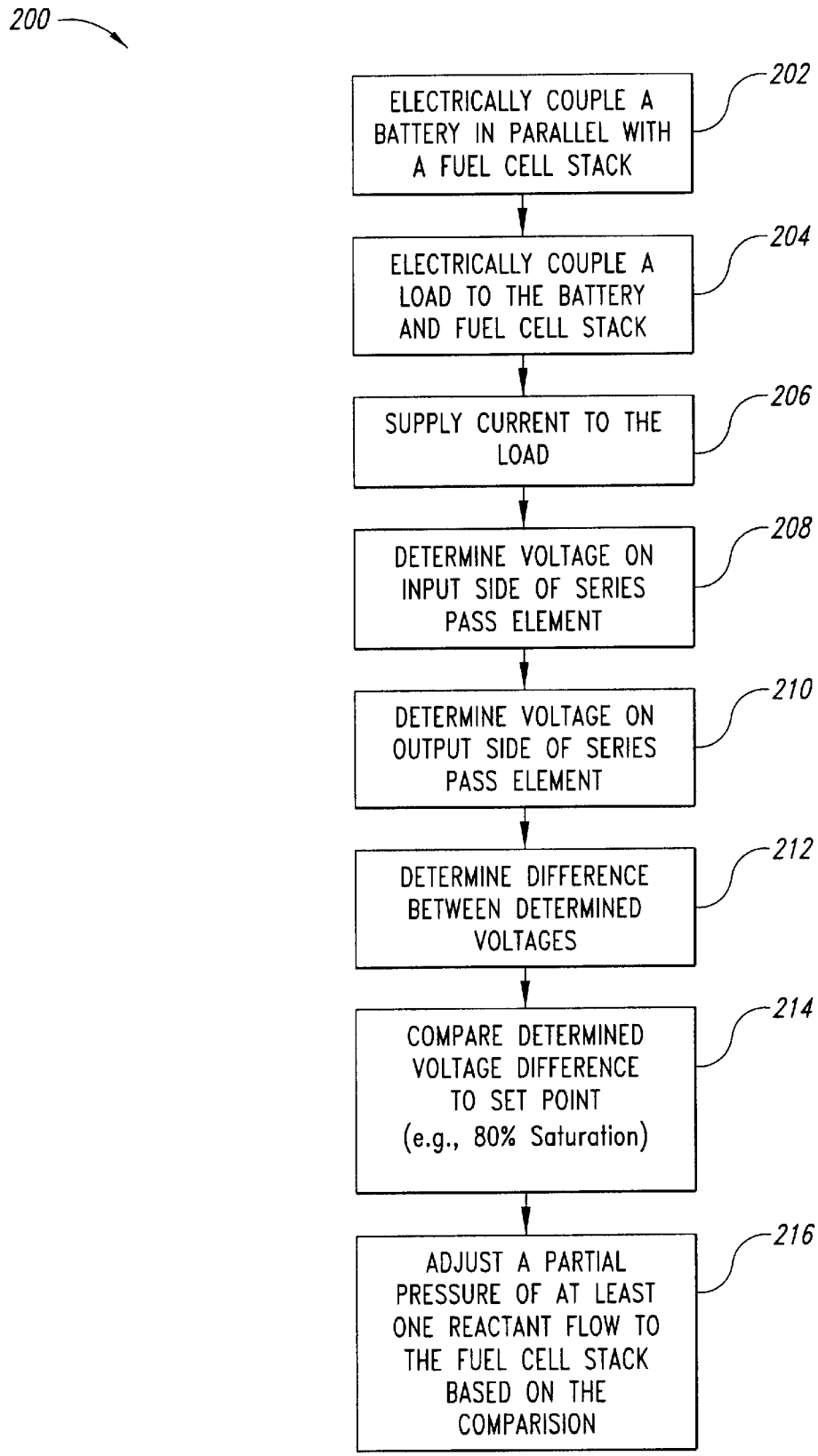
FIG. 6 is a flow diagram of an exemplary method of operating the second stage of the fuel cell system of FIG. 5.

FIG. 6 illustrates an exemplary method 200 of operating the second stage of the fuel cell system 10, of FIGS. 1 and 5. In step 102, the battery 24 is electrically coupled in parallel with the fuel cell stack 14. In step 204, the load 12 is electrically coupled to the battery 24 and fuel cell stack 14. In step 206, at least one of the fuel cell stack 14 and battery 24 supplies current to the load 12. The fuel cell stack 12 supplies the current to the load 12 where the fuel cell stack 14 is producing sufficient current to meet the demand of the load 12. Excess current from the fuel cell stack 14 recharges the battery 24. The battery 24 may supply a portion or even all of the power to the load 12 where the fuel cell stack 14 is not producing sufficient power to meet the demand.

In step 208, the second stage of the fuel cell system 10 determines the first voltage $V_1$ on the input side of the series pass element 32. In step 210, the second stage of the fuel cell system 10 determines the second voltage $V_2$ on the output side of the series pass element 32. The order of steps 208 and 210 are not important, and can occur in any order or even at a same time.

In step 212, the first comparator 90 determines the difference between the first and the second voltages $V_1$, $V_2$. In step 214, the second comparator 92 compares the determined difference $\Delta V$ to the set point. In step 216, the second stage of the fuel cell system 10 adjusts a partial pressure of at least one reactant flow to the fuel cell stack 14 via the actuator 30 and valve 18 based on the determined amount of deviation. For example, fuel cell system 10 may adjust the partial pressure of the hydrogen, the partial pressure of the oxidant (e.g., air), or the partial pressure of both the hydrogen and the oxidant. As discussed above, by varying the partial pressure of fuel and/or oxidant, the value of the internal series resistance $R_S$ inherent in the fuel cell stack 14 can be varied to control the voltage that is dropped at any given stack output current. By varying the partial pressure in such a way, the maximum voltage dropped across the series pass element 32 can be reduced.

Figure 7:
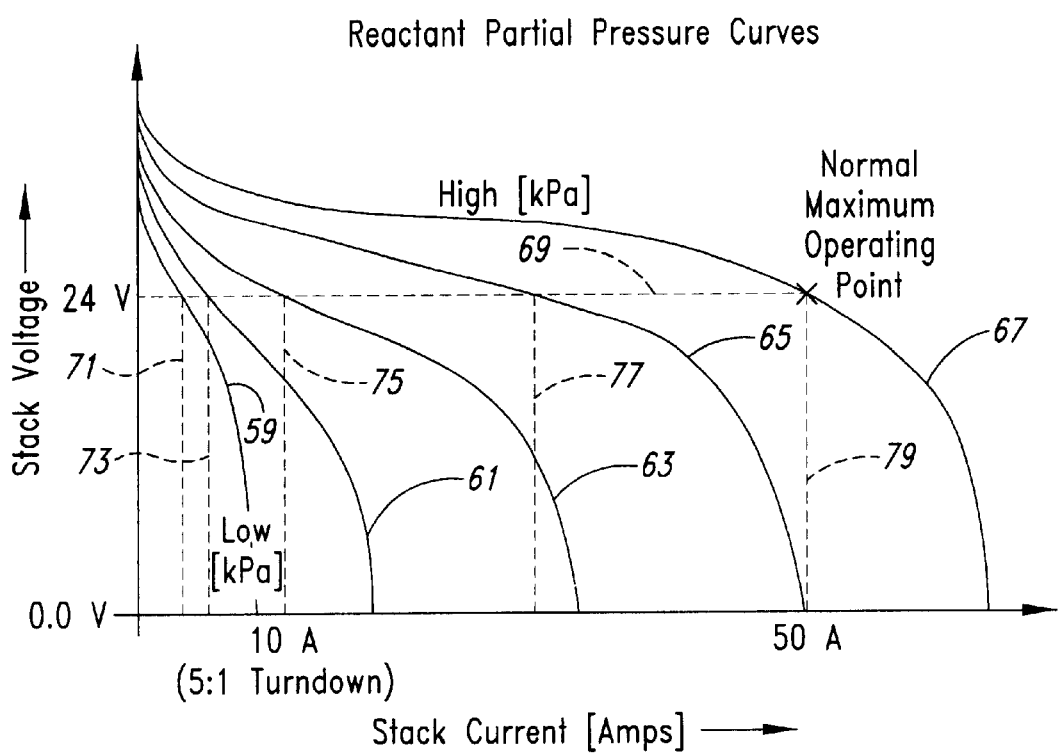
FIG. 7 is a graphical representation of the polarization curves for an exemplary fuel cell stack, for five exemplary partial pressures.

FIG. 7 illustrates exemplary polarization curves for the fuel cell stack 14, corresponding to five different reactant partial pressures. Stack voltage $V_S$ is represented along the vertical axis, and stack current $I_S$ represented along the horizontal axis. A first curve 59 represents the polarization at a low reactant partial pressure. Curves 61, 62, 63 and 65 represent the polarization at successively increasing reactant partial pressures. A broken line 69 illustrates a constant nominal output voltage of 24 volts. Vertical broken lines 71, 723, 75, 77, 79 illustrate the stack current corresponding to the 24 volt output for the respective partial pressure curves 59, 61, 63, 65, 67.

Figure 8:
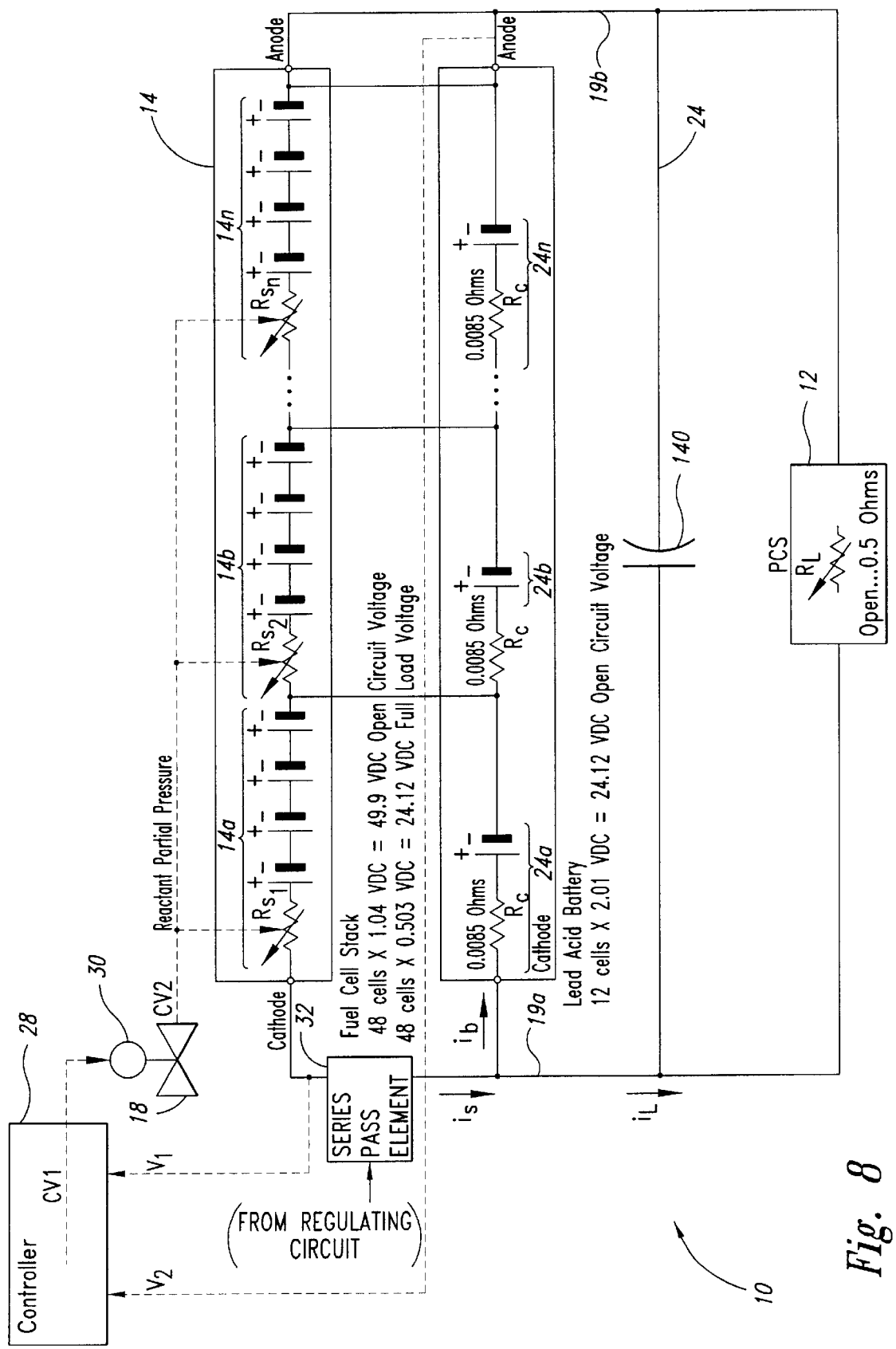
FIG. 8 is a schematic diagram of an alternative embodiment of the fuel cell system of FIG. 1, in which portions of the fuel cell stack are interconnected with portions of the battery.

Battery Portions/Fuel Cell Portions Interconnected Embodiment of Fuel Cell System FIG. 8 shows a further embodiment of the fuel cell system 10 where the where portions of the battery 24 are interconnected with portions of the fuel cell stack 14.

In particular, the fuel cell stack 14 can include a number of groups or portions 14a, 14b, . . . 14n which are interconnected with respective groups or portions of the battery 24a, 24b, . . . 24n. While illustrated as one battery cell 24a, 24b, . . . 24n to each set of fuel cells 14a, 14b, . . . 14n, the fuel cell system 10 can employ other ratios of battery cells to fuel cells.

The fuel cell system 10 can include a capacitor, such as a super-capacitor 140, electrically coupled in parallel across the load 12. The fuel cell system 10 of FIG. 8 may be operated in accordance with the methods 100 and 200 of FIGS. 4 and 6.

While not illustrated in FIG. 8, separate control elements such as valve 18, controller 28, and/or actuator 30 can be associated with respective ones of the sets of fuel cells 14a, 14b. . . 14n.

Currents, Voltages and Resistance of Fuel Cell System and Load

FIGS. 9A–9F show a series of graphs illustrating the relationship between various currents, voltages, and resistance in the fuel cell system 10 in single phase AC operation where the fuel cell stack is sufficiently powering the load without draining or recharging the battery. The various graphs of FIGS. 9A–9F share a common, horizontal time axis.

FIG. 9A is a graph 150 illustrating the actual stack current $I_S$ and the average stack current $I_{S-AVG}$ as a function of time. FIG. 9B is a graph 152 illustrating the actual battery current $I_B$ as a function of time. FIG. 9C is a graph 154 illustrating the actual battery voltage $V_B$ and the average battery voltage $V_{B-AVG}$ as a function of time. FIG. 9D is a graph 156 illustrating the actual current through the load $I_L$ and the average load current $I_L$-AVG as a function of time. FIG. 9E is a graph 158 illustrating the actual load resistance $R_L$ as a function of time. FIG. 9F is a graph 160 illustrating an AC voltage $V_{ac}$ across the load 12 as a function of time.

FIGS. 10A–10C show a series of graphs illustrating the relationship between various currents, voltages, and resistance in the fuel cell system 10 in single phase AC operation where the battery supplies current to the load to cover a shortfall from the fuel cell stack and the fuel cell stack later recharges the battery. The various graphs of FIGS. 10A–10C share a common, horizontal time axis.

FIG. 10A is a graph 162 illustrating the stack current $I_S$ as a function of time. FIG. 10B is a graph 164 illustrates the battery current $I_B$ as a function of time. FIG. 10C is a graph 166 illustrating the load current $I_L$ as a function of time. As can be seen from FIGS. 10A–10C, as the load 12 increases demand, the battery 24 supplies current to make up for the shortfall from the fuel cell stack 14. As the load 12 decreases demand, the fuel cell stack 14 recharges the battery 24 until the battery 24 returns to the float voltage.

Fuel Cell Systems As Component Blocks Of Combined Fuel Cell System

FIG. 11 shows a number of fuel cell systems 10a–10f, electrically coupled to form a combined fuel cell system 10g, for powering the load 12 at a desired voltage and current. The fuel cell systems 10a–10f can take the form of any of the fuel cell systems 10 discussed above, for example the fuel cell systems 10 illustrated in FIGS. 1 and 2.

The combined fuel cell system 10g takes advantage of a matching of polarization curves between the fuel cell stacks 14 and the respective batteries 24. One approach to achieving the polarization curve matching includes the first stage regulating scheme generally discussed above. Another approach includes controlling a partial pressure of one or more reactant flows based on a deviation of a voltage across the battery 24 from a desired voltage across the battery 24. A further approach includes controlling a partial pressure of one or more reactant flows based on a deviation of a battery charge from a desired battery charge. The battery charge can be determined by integrating the flow of charge to and from the battery 24. Other approaches may include phase or pulse switching regulating or control schemes.

As an example, each of the fuel cell systems 10a–10f may be capable of providing a current of 50A at 24V. Electrically coupling a first pair of the fuel cell systems 10a, 10b in series provides 50A at 48V. Similarly electrically coupling a second pair of the fuel cells systems 10c, 10d in series provides 50A at 48V. Electrically coupling these two pairs of fuel cell systems 10a, 10b and 10c, 10d in parallel provides 100A at 48V. Electrically coupling a third pair of fuel cells systems 10e, 10f in series provides an 50A at 48V. Electrically coupling the third pair of fuel cell systems 10e, 10f in parallel with the first pair of series coupled fuel cell systems 10a:10b and the second pair of series coupled fuel cell systems 10c:10d, provides 150A at 48V.

FIG. 11 shows only one possible arrangement. One skilled in the art will recognize that other arrangements for achieving a desired voltage and current are possible. A combined fuel cell system 10g may include a lesser or greater number of individual fuel cell systems 10a–10f than illustrated in FIG. 11. Other combinations of electrically coupling numbers of individual fuel cell systems 10 can be used to provide power at other desired voltages and currents. For example, one or more additional fuel cell systems (not shown) can be electrically coupled in parallel with one or more of the fuel cell systems 10a–10b. Additionally, or alternatively, one or more additional fuel cell systems (not shown) can be electrically coupled in series with any of the illustrated pairs of fuel cell systems 10a:10b, 10c:10d, 10e:10f. Further, the fuel cell systems 10a–10f may have different voltage and/or current ratings. The individual fuel cell systems 10a–10f can be combined to produce an "n+I" array, providing a desired amount of redundancy and high reliability.

Although specific embodiments of and examples for the fuel cell system and method are described herein for illustrative purposes, various equivalent modifications can be made without departing from the spirit and scope of the invention, as will be recognized by those skilled in the relevant art. For example, the teachings provided herein can be applied to fuel cell systems including other types of fuel cell stacks or fuel cell assemblies, not necessarily the polymer exchange membrane fuel cell assembly generally described above. Additionally or alternatively, the fuel cell system 10 can interconnect portions of the fuel cell stack 14 with portions of the battery B1, B2. The fuel cell system can employ various other approaches and elements for adjusting reactant partial pressures. The various embodiments described above can be combined to provide further embodiments. U.S. patent application Ser. No. 10/017,470, entitled "METHOD AND APPARATUS FOR CONTROLLING VOLTAGE FROM A FUEL CELL SYSTEM"; and U.S. patent application Ser. No. 10/017,462, entitled "METHOD AND APPARATUS FOR MULTIPLE MODE CONTROL OF VOLTAGE FROM A FUEL CELL SYSTEM", both filed concurrently with this application, are incorporated herein by reference in their entirety. Aspects of the invention can be modified, if necessary, to employ systems, circuits and concepts of the various patents, applications and publications to provide yet further embodiments of the invention. For example, the fuel cell system 10 can additionally, or alternatively control the reactant partial pressure as a function of the either the battery voltage $V_B$, current flow to and from the battery 24 or battery charge, as taught in U.S. patent application Ser. No. 10/017,470, entitled "METHOD AND APPARATUS FOR CONTROLLING VOLTAGE FROM A FUEL CELL SYSTEM".

These and other changes can be made to the invention in light of the above-detailed description. In general, in the following claims, the terms used should not be construed to limit the invention to the specific embodiments disclosed in the specification and claims, but should be construed to include all fuel cell systems that operate in accordance with the claims. Accordingly, the invention is not limited by the disclosure, but instead its scope is to be determined entirely by the following claims.

What is claimed is:

1. A fuel cell system, comprising:
    a fuel cell stack having a number of fuel cells;
    a battery having a number of battery cells electrically couplable in parallel across the fuel cell stack;
    a series pass element electrically coupled between at least a portion of the fuel cell stack and a portion of the battery;
    a regulating circuit for regulating current through the series pass element in response to a greater of a battery charging current error, a battery voltage error and a stack current error;
    a reactant delivery system for delivering reactant to the fuel cells, the reactant delivery system including at least a first control element adjustable to control a partial pressure in a flow of a reactant to at least some of the fuel cells; and
    a control circuit coupled to receive signals corresponding to a voltage on an input side and an output side of the series pass element and configured to determine a deviation of a voltage difference across the series pass element from a desired operational condition based on the received signals, the control circuit further coupled to control the at least first control element based on the determined deviation.

2. The fuel cell system of claim 1 wherein the regulating circuit comprises:
    a battery charging current error integrator having a first input coupled to receive a battery charging current signal and a second input coupled to receive a battery charging current limit signal;
    a battery voltage error integrator having a first input coupled to receive a battery voltage signal and a second input coupled to receive a battery voltage limit signal; and
    a stack current error integrator having a first input coupled to receive a stack current signal and a second input coupled to receive a stack current limit signal.

3. The fuel cell system of claim 1 wherein the regulating circuit comprises:
    a charge pump; and
    a level shifter coupled between the charge pump and the series pass element.

4. The fuel cell system of claim 1 wherein the regulating circuit comprises:
    an OR circuit.

5. The fuel cell system of claim 1 wherein the regulating circuit comprises:
    a battery charging current error integrator having a first input coupled to receive a battery charging current signal and a second input coupled to receive a battery charging current limit signal;
    a battery voltage error integrator having a first input coupled to receive a battery voltage signal and a second input coupled to receive a battery voltage limit signal;
    a stack current error integrator having a first input coupled to receive a stack current signal and a second input coupled to receive a stack current limit signal;
    an OR circuit having an input side and an output side, the input side coupled to the battery charging current error integrator, the battery voltage error integrator, and the stack current error integrator;
    a level shifter electrically coupled between the OR circuit and the series pass element; and a charge pump coupled to supply a charge to the series pass element via the level shifter.

6. The fuel cell system of claim 1 wherein the series pass element comprises a field effect transistor.

7. The fuel cell system of claim 1 wherein at least a portion of the battery is electrically coupled in parallel with at least a portion of the fuel cell stack.

8. The fuel cell system of claim 1 wherein the control circuit comprises a first comparator coupled to receive a first and a second voltage, and a second comparator coupled to receive the voltage difference from the first comparator and value corresponding to the desired operational condition.

9. The fuel cell system of claim 1 wherein the control circuit comprises a first comparator coupled to receive a first and a second voltage, and a second comparator coupled to receive the voltage difference from the first comparator and value corresponding to the desired operational condition, wherein the desired operational condition is between approximately 75 percent and 95 percent of a saturation level for the series pass element.

10. A fuel cell system, comprising:
   a number of fuel cells forming a fuel cell stack;
   a number of battery cells forming a battery;
   a series pass element;
   a blocking diode electrically coupled between the fuel cell stack and the series pass element;
   a regulating circuit for regulating current through the series pass element in proportion to at least a greater of a difference between a battery charging current and a battery charging current limit, a difference between a battery voltage and a battery voltage limit, and a difference between a stack current and a stack current limit;
   a reactant delivery system for delivering reactant to the fuel cells, the reactant delivery system including at least a first flow regulator adjustable to control a partial pressure in a flow of a reactant to at least some of the fuel cells; and
   a control circuit coupled to receive signals corresponding to a voltage across the series pass element and to provide a control signal to at least the first control element mathematically related to a voltage difference across the series pass element.

11. The fuel cell system of claim 10 wherein the regulating circuit comprises:
   a battery current integrator having a first input, a second input and an output, the first input coupled to receive a battery current value and the second input coupled to receive a battery current limit value;
   a battery voltage integrator having a first input, a second input and an output, the first input coupled to receive a battery voltage value and the second input coupled to receive a battery voltage limit value;
   a stack current integrator having a first input, a second input and an output, the first input coupled to receive a stack current value and the second input coupled to receive a stack current limit value; and
   an OR circuit coupled to the output of each of the battery current integrator, the battery voltage integrator and the stack current integrator to select the greater of a value on each of the respective outputs.

12. The fuel cell system of claim 10 wherein the regulating circuit comprises:
   a level shifter electrically coupled between the OR circuit and the series pass element; and
   a charge pump coupled to provide current to the series pass element through the level shifter.

13. The fuel cell system of claim 10 wherein the regulating circuit comprises:
   a battery current integrator having a first input, a second input and an output, the first input coupled to receive a battery current value and the second input coupled to receive a battery current limit value;
   a battery voltage integrator having a first input, a second input and an output, the first input coupled to receive a battery voltage value and the second input coupled to receive a battery voltage limit value;
   a stack current integrator having a first input, a second input and an output, the first input coupled to receive a stack current value and the second input coupled to receive a stack current limit value;
   an OR circuit coupled to the output of each of the battery current integrator, the battery voltage integrator and the stack current integrator;
   a level shifter coupled to the OR circuit to receive the greater of the value on each of the outputs; and
   a charge pump coupled to the series pass element through the level shifter.

14. The fuel cell system of claim 10 wherein the regulating circuit comprises a microprocessor programmed to regulate the current through the series pass element by:
   integrating a difference between a battery current and a battery current limit;
   integrating a difference between a battery voltage and a battery voltage limit;
   integrating a difference between a stack current and a stack current limit;
   selecting a greater of the integrated differences; and
   applying a control signal to the series pass element proportional to the greater of the integrated differences.

15. The fuel cell system of claim 10, further comprising:
   a battery charging current sensor;
   a battery voltage sensor; and
   a stack current sensor.

16. The fuel cell system of claim 10, further comprising:
   a battery charging current sensor;
   a stack current sensor;
   battery voltage sensor;
   a battery temperature sensor; and
   a temperature compensation circuit coupled to the battery temperature sensor to produce a battery voltage limit that is temperature compensated.

17. A circuit for a fuel cell system having a fuel cell stack and a battery, the circuit comprising:
   a series pass element electrically coupleable between at least a portion of the fuel cell stack and a portion of the battery;
   a regulating circuit for regulating current through the series pass element in response to a greater of a battery charging current error, a battery voltage error and a stack current error; and
   a control circuit coupled to receive signals corresponding to a voltage on an input side and an output side of the series pass element and configured to determine a deviation of a voltage difference across the series pass element from a desired operational condition based on the received signals and to produce a control signal based on the determined deviation.

18. The circuit of claim 17 wherein the regulating circuit comprises:
- a battery charging current error integrator having a first input coupled to receive a battery charging current signal proportional to a battery charging current, a second input coupled to receive a battery charging current limit signal proportional to a battery charging current limit, and an output to supply a battery current error signal proportional to a difference between the battery charging current and the battery charging current limit;
- a battery voltage error integrator having a first input coupled to receive a battery voltage signal proportional to a battery voltage, a second input coupled to receive a battery voltage limit signal proportional to a battery voltage limit, and an output to supply a battery voltage error signal proportional to a difference between the battery voltage and the battery voltage limit;
- a stack current error integrator having a first input coupled to receive a stack current signal proportional to a stack current, a second input coupled to receive a stack current limit signal proportional to a stack current limit, and an output to supply a stack current error signal proportional to a difference between the stack current and the stack current limit; and
- an OR circuit coupled to the output of each of the error integrators to select a greater one of the error signals from the error integrators.

19. The circuit of claim 17 wherein the series pass element comprises a transistor having a first terminal, a second terminal and a control terminal, the first and the second terminals coupleable between the fuel cell stack and the battery, and wherein the regulating circuit comprises:
- a level shifter coupled to receive the greater of the battery charging current error, the battery voltage error and the stack current error; and
- a charge pump coupled to the control terminal of the transistor by way of the level shifter.

20. A circuit for a fuel cell system, comprising:
- a series pass element;
- a blocking diode electrically coupled in series with the series pass element;
- a regulating circuit coupled to the series pass element to regulate a current through the series pass element in proportion to at least a greater of a difference between a battery charging current and a battery charging current limit, a difference between a battery voltage and a battery voltage limit, and a difference between a stack current and a stack current limit; and
- a control circuit coupled to receive signals corresponding to a voltage across the battery and to provide a control signal mathematically related to a difference between the voltage across the battery and a defined desired voltage across the battery.

21. The circuit of claim 20, further comprising:
- a battery charging current sensor;
- a battery voltage sensor; and
- a stack current sensor.

22. The circuit of claim 20 wherein the regulating circuit comprises:
- a battery current integrator having a first input, a second input and an output, the first input coupled to receive a battery current value and the second input coupled to receive a battery current limit value;
- a battery voltage integrator having a first input, a second input and an output, the first input coupled to receive a battery voltage value and the second input coupled to receive a battery voltage limit value;
- a stack current integrator having a first input, a second input and an output, the first input coupled to receive a stack current value and the second input coupled to receive a stack current limit value; and
- an OR circuit coupled to the output of each of the battery current integrator, the battery voltage integrator and the stack current integrator to select the greater of a value on each of the outputs.

23. The circuit of claim 20 wherein the regulating circuit comprises:
- a battery current integrator having a first input, a second input and an output, the first input coupled to receive a battery current value and the second input coupled to receive a battery current limit value;
- a battery voltage integrator having a first input, a second input and an output, the first input coupled to receive a battery voltage value and the second input coupled to receive a battery voltage limit value;
- a stack current integrator having a first input, a second input and an output, the first input coupled to receive a stack current value and the second input coupled to receive a stack current limit value;
- an OR circuit coupled to the output of each of the battery current integrator, the battery voltage integrator and the stack current integrator to select the greater of a value on each of the outputs;
- a level shifter coupled to the OR circuit to receive the greater of the value on each of the outputs; and
- a charge pump coupled to the series pass element through the level shifter.

24. The circuit of claim 20 wherein the series pass element comprises a field effect transistor.

25. A circuit for a fuel cell system, comprising:
- a battery charging current sensor;
- a battery charging current error integrator having a first input coupled to the battery charging current sensor to receive a battery charging current signal proportional to a battery charging current, a second input coupled to receive a battery charging current limit signal proportional to a battery charging current limit, and an output to supply a battery current error signal proportional to a difference between the battery charging current and the battery charging current limit;
- a battery voltage sensor;
- a battery voltage error integrator having a first input coupled to the battery voltage sensor to receive a battery voltage signal proportional to a battery voltage, a second input coupled to receive a battery voltage limit signal proportional to a battery voltage limit, and an output to supply a battery voltage error signal proportional to a difference between the battery voltage and the battery voltage limit;
- a stack current sensor;
- a stack current error integrator having a first input coupled to the stack current sensor to receive a stack current signal proportional to a stack current, a second input coupled to receive a stack current limit signal proportional to a stack current limit, and an output to supply a stack current error signal proportional to a difference between the stack current and the stack current limit;
- an OR circuit coupled to the output of each of the battery current error integrator, the battery voltage error integrator and the stack current error integrator;

a series pass element having a pair of terminals for selectively providing a current path and a control terminal coupled to the OR circuit for regulating current through the current path in proportion to a greater of the battery current error signal, the battery voltage error signal and the stack current error signal; and a control circuit coupled to receive signals corresponding to a voltage on an input side and an output side of the series pass element and configured to determine a deviation of a voltage difference across the series pass element from a desired operational condition based on the received signals and to produce a control signal based on the determined deviation.

26. The circuit of claim 25 wherein the regulating circuit comprises a number of discrete integrators.

27. The circuit of claim 25 wherein the regulating circuit comprises a microprocessor.

28. The circuit of claim 25, further comprising:
a temperature compensation circuit coupled to the battery temperature sensor to produce a battery voltage limit that is compensated for temperature.

29. A circuit for a fuel cell system, comprising:
means for determining a greater of a difference between a battery charging current and a battery charging current limit, a difference between a battery voltage and a battery voltage limit, and a difference between a stack current and a stack current limit;

series pass regulating means for regulating a flow of stack current through a blocking diode in proportion to the determined greater difference;

means for determining a difference between a voltage difference across the series pass regulating means and a desired a desired operational condition of the series pass regulating means; and means for controlling a partial pressure of at least one reactant flow in proportion to the determined difference between the voltage difference across the series pass regulating means and the desired operational condition of the series pass regulating means.

30. The circuit of claim 29, comprising:
integrating means for determining the difference between the battery charging current and the battery charging current limit;

integrating means for determining the difference between the battery voltage and the battery voltage limit; and integrating means for determining the difference between the stack current and the stack current limit.

31. The circuit of claim 29 wherein the means for determining a difference between a voltage difference across the series pass regulating means and a desired a desired operational condition of the series pass regulating means includes first comparator means for comparing a first voltage on an input side of the series pass regulating means and a second voltage on an output side of the series pass regulating means, and second comparator means for comparing the voltage difference across the series pass regulating means with a value corresponding to a desired percentage of a saturation value for the series pass regulating means.

32. A method of operating a fuel cell system, comprising:
supplying current at a number of output terminals from at least one of a fuel cell stack and a battery electrically coupled in parallel with the fuel cell stack;

in a first stage, regulating a current through a series pass element in proportion to at least a greater of a difference between a battery charging current and a battery charging current limit, a difference between a battery voltage and a battery voltage limit, and a difference between the stack current and the stack current limit; and in a second stage, adjusting a partial pressure of a reactant flow to at least a portion of the fuel cell stack to maintain a series pass element at a desired saturation level.

33. The method of claim 32 wherein the first stage and the second stage occur during a same time.

34. The method of claim 32, further comprising:
determining a first voltage on an input side of the series pass element;

determining a second voltage on an output side of the series pass element;

determining a difference in voltage across the series pass element from the first and the second voltages; and determining an amount of deviation of the difference in voltage across the series pass element from a value corresponding to the desired saturation level, and wherein adjusting a partial pressure of a reactant flow to at least a portion of the fuel cell stack to maintain the series pass element at the desired saturation level includes adjusting the partial pressure of the reactant flow based on the determined amount of deviation.

35. A method of operating in a fuel cell system, the method comprising:
determining a battery charging current error;

determining a battery voltage error;

determining a stack current error;

regulating current through a series pass element in response to a greater of the battery charging current error, the battery voltage error and the stack current error;

determining a voltage difference across the series pass element;

determining an amount of deviation of the determined voltage difference from a desired operational condition of the series pass element; and for at least one reactant flow to at least a portion of the fuel cell stack, adjusting a partial pressure of the reactant flow based on the determined amount of deviation.

36. The method of claim 35 wherein,
determining a battery charging current error includes integrating a difference between a battery charging current and a battery charging current limit over time;

determining a battery voltage error includes integrating a difference between a battery voltage and a battery voltage limit over time; and determining a stack current error includes integrating a difference between a stack current and a stack current limit over time.

37. The method of claim 35, further comprising:
selecting the greater of the battery charging current error, the battery voltage error and the stack current error;

level shifting the selected one of the battery charging current error, the battery voltage error and the stack current error; and applying the level shifted selected one of the battery charging current error, the battery voltage error and the stack current error to a control terminal of the series pass element.

38. The method of claim 35, further comprising:
determining a temperature proximate a battery;

determining a battery voltage limit based at least in part on the determined temperature; and integrating a difference between a battery voltage and the determined battery voltage limit over time to determine the battery voltage error.

39. The method of claim 35, further comprising:

selectively coupling charge from a charge pump to a control terminal of the series pass element in response to the greater of the battery charging current error, the battery voltage error and the stack current error.

40. The method of claim 35, further comprising:

selectively coupling charge from a charge pump to a control terminal of the series pass element in response to the battery charging current error at a first time, the battery voltage error at a second time and the stack current error at a third time.

41. The method of claim 35, further comprising:

determining a first voltage on an input side of the series pass element; and determining a second voltage on an output side of the series pass element.

42. The method of claim 35, further comprising:

determining a first voltage on an input side of the series pass element; and determining a second voltage on an output side of the series pass element, and wherein determining a voltage difference across the series pass element includes determining the difference between the first and the second voltages.

43. The method of claim 35 wherein determining an amount of deviation of the determined voltage difference from a desired operational condition of the series pass element includes determining a difference between the determined voltage difference and a value corresponding to a percentage of a saturation level of the series pass element, where the percentage is between approximately 75 percent and approximately 95 percent.

44. The method of claim 35 wherein adjusting a partial pressure of the reactant flow based on the determined amount of deviation includes adjusting a partial pressure of a flow of fuel to at least a portion of the fuel cell stack and adjusting a partial pressure of a flow of oxidant to at least the same portion of the fuel cell stack.

45. The method of claim 35, further comprising:

holding a pressure of the at least one reactant flow approximately constant while adjusting the partial pressure of the at least one reactant flow.

46. A method of operating in a fuel cell system, the method comprising:

determining a difference between a battery charging current and a battery charging current limit;

determining a difference between a battery voltage and a battery voltage limit;

determining a difference between a-stack current and a stack current limit;

regulating a current through a series pass element in proportion to at least a greater of the difference between the battery charging current and the battery charging current limit, the difference between the battery voltage and the battery voltage limit, and the difference between the stack current and the stack current limit;

determining a voltage difference across the series pass element;

determining an amount of deviation of the determined voltage difference from a desired operational condition of the series pass element; and for at least one reactant flow to at least a portion of the fuel cell stack, adjusting a partial pressure of the reactant flow based on the determined amount of deviation.

47. The method of claim 46, further comprising:

selecting the greater of the battery charging current error, the battery voltage error and the stack current error;

level shifting the selected one of the battery charging current error, the battery voltage error and the stack current error; and applying the level shifted selected one of the battery charging current error, the battery voltage error and the stack current error to a control terminal of the series pass element.

48. The method of claim 46, further comprising:

determining a temperature proximate a battery;

determining the battery voltage limit based at least in part on the determined temperature.

49. The method of claim 46, further comprising:

selectively coupling charge from a charge pump to a control terminal of the series pass element in proportion to the greater of the battery charging current error, the battery voltage error and the stack current error.

50. The method of claim 46, further comprising:

selectively coupling charge from a charge pump to a control terminal of the series pass element in proportion to the battery charging current error at a first time, the battery voltage error at a second time and the stack current error at a third time.

51. A fuel cell system, comprising:

a voltage bus;

a first fuel cell stack electrically couplable across the voltage bus;

a first battery electrically couplable across the voltage bus;

a first series pass element electrically coupled in series on the voltage bus between at least a portion of the first fuel cell stack and a portion of the first battery;

a first regulating circuit for regulating current through the first series pass element in response to a greater of a battery charging current error, a battery voltage error and a stack current error;

a first reactant delivery system for delivering reactant to the first fuel cell stack, the reactant delivery system including at least a first control element adjustable to control a partial pressure in a flow of a reactant to at least some of the fuel cells of the first fuel cell stack;

a first control circuit coupled to receive signals corresponding to a voltage on an input side and a voltage on an output side of the first series pass element and configured to determine a deviation of a voltage difference across the first series pass element from a desired operational condition based on the received signals, the first control circuit further coupled to control the at least first control element based on the determined deviation;

a second fuel cell stack electrically couplable across the voltage bus;

a second battery electrically couplable across the voltage bus;

a second series pass element electrically coupled in series on the voltage bus between at least a portion of the second fuel cell stack and a portion of the second battery;

a second regulating circuit for regulating current through the second series pass element in response to a greater of a battery charging current error, a battery voltage error and a stack current error;

a second reactant delivery system for delivering reactant to the second fuel cell stack, the reactant delivery system including at least a second control element adjustable to control a partial pressure in a flow of a reactant to at least some of the fuel cells of the second fuel cell stack; and a second control circuit coupled to receive signals corresponding to a voltage on an input side and a voltage on an output side of the second series pass element and configured to determine a deviation of a voltage difference across the second series pass element from a desired operational condition based on the received signals, the second control circuit further coupled to control the at least second control element based on the determined deviation.

52. The fuel cell system of claim 51 wherein the second fuel cell stack, the second battery and the second series pass element are electrical coupled in series with the first fuel cell stack, the first battery and the first series pass element.

53. The fuel cell system of claim 51 wherein the second fuel cell stack, the second battery and the second series pass element are electrical coupled in parallel with the first fuel cell stack, the first battery and the first series pass element.

54. The fuel cell system of claim 51, further comprising:

a third fuel cell stack electrically couplable across the voltage bus;

a third battery electrically couplable across the voltage bus;

a third series pass element electrically coupled in series on the voltage bus between at least a portion of the third fuel cell stack and a portion of the third battery;

a third regulating circuit for regulating current through the third series pass element in response to a greater of a battery charging current error, a battery voltage error and a stack current error;

a third reactant delivery system for delivering reactant to the third fuel cell stack, the reactant delivery system including at least a third control element adjustable to control a partial pressure in a flow of a reactant to at least some of the fuel cells of the third fuel cell stack; and a third control circuit coupled to receive signals corresponding to a voltage on an input side and a voltage on an output side of the third series pass element and configured to determine a deviation of a voltage difference across the third series pass element from a desired operational condition based on the received signals, the third control circuit further coupled to control the at least third control element based on the determined deviation.

55. The fuel cell system of claim 51, further comprising:

a third fuel cell stack electrically couplable across the voltage bus;

a third battery electrically couplable across the voltage bus;

a third series pass element electrically coupled in series on the voltage bus between at least a portion of the third fuel cell stack and a portion of the third battery;

a third regulating circuit for regulating current through the third series pass element in response to a greater of a battery charging current error, a battery voltage error and a stack current error, wherein the second fuel cell stack, the second battery and the second series pass element are electrical coupled in series with the first fuel cell stack, the first battery and the first series pass element and wherein the third fuel cell stack, the third battery and the third series pass element are electrical coupled in series with the first and the second fuel cell stack, the first and the second battery and the first and the second series pass element;

a third reactant delivery system for delivering reactant to the third fuel cell stack, the reactant delivery system including at least a third control element adjustable to control a partial pressure in a flow of a reactant to at least some of the fuel cells of the third fuel cell stack; and a third control circuit coupled to receive signals corresponding to a voltage on an input side and a voltage on an output side of the third series pass element and configured to determine a deviation of a voltage difference across the third series pass element from a desired operational condition based on the received signals, the third control circuit further coupled to control the at least third control element based on the determined deviation.

56. The fuel cell system of claim 51, further comprising:

a third fuel cell stack electrically couplable across the voltage bus;

a third battery electrically couplable across the voltage bus;

a third series pass element electrically coupled in series on the voltage bus between at least a portion of the third fuel cell stack and a portion of the third battery;

a third regulating circuit for regulating current through the third series pass element in response to a greater of a battery charging current error, a battery voltage error and a stack current error, wherein the second fuel cell stack, the second battery and the second series pass element are electrical coupled in series with the first fuel cell stack, the first battery and the first series pass element and wherein the third fuel cell stack, the third battery and the third series pass element are electrical coupled in parallel with the first and the second fuel cell stack, the first and the second battery and the first and the second series pass element;

a third reactant delivery system for delivering reactant to the third fuel cell stack, the reactant delivery system including at least a third control element adjustable to control a partial pressure in a flow of a reactant to at least some of the fuel cells of the third fuel cell stack; and a third control circuit coupled to receive signals corresponding to a voltage on an input side and a voltage on an output side of the third series pass element and configured to determine a deviation of a voltage difference across the third series pass element from a desired operational condition based on the received signals, the third control circuit further coupled to control the at least third control element based on the determined deviation.

57. A fuel cell system combination, comprising:

a voltage bus;

a first fuel cell system having a first fuel cell stack and a first battery electrically coupled in parallel across the voltage bus; and a second fuel cell system having a second fuel cell stack and a second battery electrically coupled in parallel across the voltage bus.

58. The fuel cell system of claim 57 wherein the first fuel cell stack has a first fuel cell polarization curve and the first battery has a first battery polarization curve, the first battery polarization approximately matching the first fuel cell polarization curve, and wherein the second fuel cell stack has a second fuel cell polarization curve and the second battery has a second battery polarization curve, the second battery polarization approximately matching the second fuel cell polarization curve.

59. The fuel cell system of claim 57, further comprising:
means for approximately matching a polarization curve of the first fuel cell stack and a polarization curve of the first battery; and
means for approximately matching a polarization curve of the second fuel cell stack and a polarization curve of the second battery.

* * * * *